United States Patent [19]

Rothfusz et al.

[11] 3,958,835
[45] May 25, 1976

[54] ADAPTIVE BRAKING CONTROL CIRCUIT

[75] Inventors: Ralph W. Rothfusz; Bruce E. Latvala, both of Elyria, Ohio

[73] Assignee: The Bendix Corporation, South Bend, Ind.

[22] Filed: Dec. 9, 1974

[21] Appl. No.: 530,785

[52] U.S. Cl. .................................. 303/21 P; 303/20
[51] Int. Cl.² .......................................... B60T 8/00
[58] Field of Search................. 188/181; 235/150.2; 244/111; 303/20, 21; 307/10 R; 317/5; 324/161–162; 340/53, 62

[56] References Cited
UNITED STATES PATENTS

| | | | |
|---|---|---|---|
| 3,499,689 | 3/1970 | Carp et al. | 303/20 X |
| 3,574,417 | 4/1971 | Howard et al. | 303/20 X |
| 3,637,264 | 1/1972 | Leiber et al. | 303/20 X |
| 3,674,320 | 7/1972 | Howard et al. | 303/21 BE X |
| 3,704,043 | 11/1972 | Hickner et al. | 303/20 X |
| 3,820,857 | 6/1974 | Schnaibel et al. | 303/21 BE |
| 3,833,268 | 9/1974 | Fleagle | 303/21 BE |
| 3,863,993 | 2/1975 | Fleischer et al. | 303/20 X |

Primary Examiner—Trygve M. Blix
Assistant Examiner—Stephen G. Kunin
Attorney, Agent, or Firm—Ken C. Decker; William N. Antonis

[57] ABSTRACT

An adaptive braking system for a vehicle having fluid pressure actuated brakes. The system includes a wheel speed sensor which generates a speed signal proportional to the rotational velocity of a vehicle wheel, and an incipient skid detecting circuit which is responsive to the speed signal to generate a skid detecting signal when an incipient skidding condition of the vehicle wheel is sensed. A modifying circuit is responsive to the output of the skid detection circuit, and generates a signal relieving the fluid pressure in the vehicle brakes when the skid detection circuit senses an incipient skidding condition. Upon termination of the incipient skidding condition, the modifying circuit causes the brake pressure communicated to the vehicle's brakes to be increased at a rate lesss than the maximum rate at which the braking pressure in the system is capable of increasing, to thereby provide a "slow build" cycle until another incipient skidding condition is sensed. The output of the modifying circuit is fed to a duty cycle translator which generates a pulsed output signal which is transmitted to a brake pressure modulator which controls fluid communication to the brakes of the vehicle.

9 Claims, 4 Drawing Figures

ADAPTIVE BRAKING CONTROL CIRCUIT

BACKGROUND OF THE INVENTION

This invention relates to an adaptive braking system for use on vehicles having fluid pressure actuated brakes.

Adaptive braking systems for vehicles having fluid pressure actuated brakes normally include a modulator which decreases braking pressure when an incipient skidding condition is detected and which also serves as the relay valve which communicates fluid pressure to the braking actuators during normal braking. In order to achieve the high vehicle deceleration rates during normal braking required by government regulations, modulators of the type discussed herein which also function as relay valves must have high flow rate capabilities. However, these high flow rates are normally detrimental to good adaptive braking performance, and consequently, most prior art modulators which also function as relay valves are provided with "pneumatic logic" to reduce the flow rate through the modulator during adaptive operation. Although these prior art modulators which incorporate "pneumatic logic" have, in general, performed acceptably, the "pneumatic logic" does increase the complexity of the modulator valve and consequently increases its cost. Furthermore, the "pneumatic logic" apparatus which must be included in the modulating valve normally includes relatively small flow-restricting orifices, which are susceptible to clogging by contaminants in the vehicle fluid pressure supply, thereby causing a failure in the adaptive braking system.

SUMMARY OF THE INVENTION

Therefore, an important object of our invention is to provide an adaptive braking control circuit which electronically provides a reduced rate of brake pressure increase by the modulator during adaptive operation.

Still another important object of our invention is to eliminate the relatively expensive and relatively failure-prone "pneumatic logic" apparatus which has generally been necessary in modulators used in prior art adaptive braking systems used with vehicles having fluid pressure actuated brakes.

Still another important object is to provide a relatively simple, low cost, adaptive braking system for vehicles having fluid pressure actuated brakes that provide a variable rate of brake pressure increase when the modulator must build pressure upon termination of a brake pressure decay cycle.

DETAILED DESCRIPTION

Figure 1:
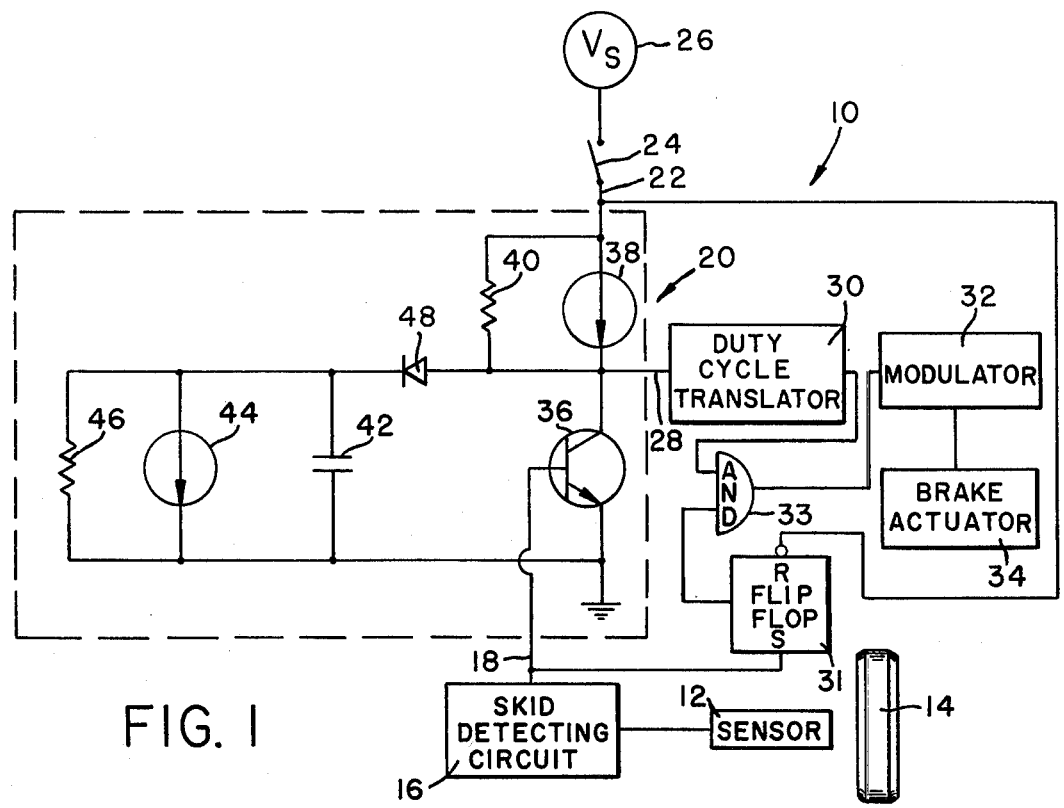
FIG. 1 is a schematic illustration of an adaptive braking system made pursuant to the teachings of our present invention.

Referring now to the drawings, the adaptive braking system generally indicated by the numeral 10 includes a wheel speed sensor 12 which is responsive to rotation of a corresponding vehicle wheel 14 to generate a speed signal proportional to the rotational velocity of the wheel 14. The signal generated by the sensor 12 is transmitted to the input terminal of a skid detection circuit 16, which may be of any type well known to those skilled in the art. Of course, if desirable, a single skid detecting circuit may be connected to more than one sensor 12 if the appropriate sorting and selecting circuitry is provided to select desired signal for use by the skid detecting circuit 16. This type of selecting and sorting circuitry is well known to those skilled in the art, and will not be described further herein. The skid detecting circuit is responsive to the signal generated by the sensor 12 and is adapted to generate an output signal on output terminal 18 whenever the circuit 16 senses an incipient skidding condition, and terminates the signal on the output terminal 18 when the incipient skidding condition terminates. The skid detection circuit 16 may be of any type well known to those skilled in the art which performs this function; for example, this circuit may be made pursuant to the teachings of U.S. Pat. No. 3,804,470, owned by the assignee of the present invention and incorporated herein by reference. The output terminal 18 is connected to one input of a signal modifying circuit generally indicated by the numeral 20. Circuit 20 further includes another terminal 22 which is connected through a switch 24 to a fixed voltage source 26. The switch 24 is closed by the vehicle brake light switch, and consequently, as long as the brakes of the vehicle are actuated, the switch 24 will be closed and the voltage source 26 will be connected to the terminal 22. Circuit 20 further includes an output terminal 28 which is connected to the input terminal of a duty cycle translator 30. The duty cycle translator 30 is designed to be responsive to the value of the control signal generated on output terminal 28 of circuit 20 to generate an output which operates the modulator 32 to achieve varying build and decay rate during adaptive operation. The duty cycle translator 30 may be of any suitable design well known to those skilled in the art, for example, the duty cycle translator disclosed in U.S. Pat. No. 3,838,892 or in U.S. Pat. Application Ser. No. 530,784 filed Dec. 9, 1974, both of which are assigned to the assignee of the instant invention and incorporated herein by reference, may be used. Similarly, the modulator valve 32 may be of the type disclosed in the aforementioned U.S. Pat. No. 3,838,892 assigned to the assignee of the present invention and incorporated by reference herein. The modulator 32, of course, controls actuation of the vehicle brake actuators 34 in the manner well known to those skilled in the art. As pointed out hereinabove, the modulator 32 permits substantially uninhibited fluid communication to the brake actuator 34, during braking which does not require intervention of the adaptive braking system 10. The set input of a flip flop 31 is connected to terminal 18, and the reset input of flip flop 31 is connected to the inverted signal on terminal 22. The output of flip flop 31 and the output of duty cycle translator 30 are connected to the inputs of AND gate 33. The output of AND gate 33 operates the modulator valve 32. Consequently, the output of duty cycle translator 30 is inhibited by flip flop 31 and AND gate 33 until circuit 18 generates an initial signal, and flip flop 31 will be reset upon release of the brakes of the vehicle.

Referring now to the signal modifying circuit 20, the output terminal 18 of skid detecting circuit 16 is connected to the base electrode of a transistor 36, the collector and emitter electrodes of which are connected to the output terminal 28 and ground, respectively. A current source 38 is connected between the terminal 22 and the terminal 28. A resistor 40 is connected in parallel with the current source 38. A capacitor 42 is connected in parallel with the transistor 36, and a current sink 44 and resistor 46 are connected in parallel with capacitor 42. The capacitor 42 is prevented from discharging through the terminal 28 by a diode 48, which, of course, permits charging of the capacitor through current source 38. The design of the current source 38 and current sink 44 are well known to those skilled in the art, and may for example, be of the type disclosed in detail in the aforementioned U.S. Pat. No. 3,804,470, owned by the assignee of the present invention and incorporated herein by reference.

Figure 3:
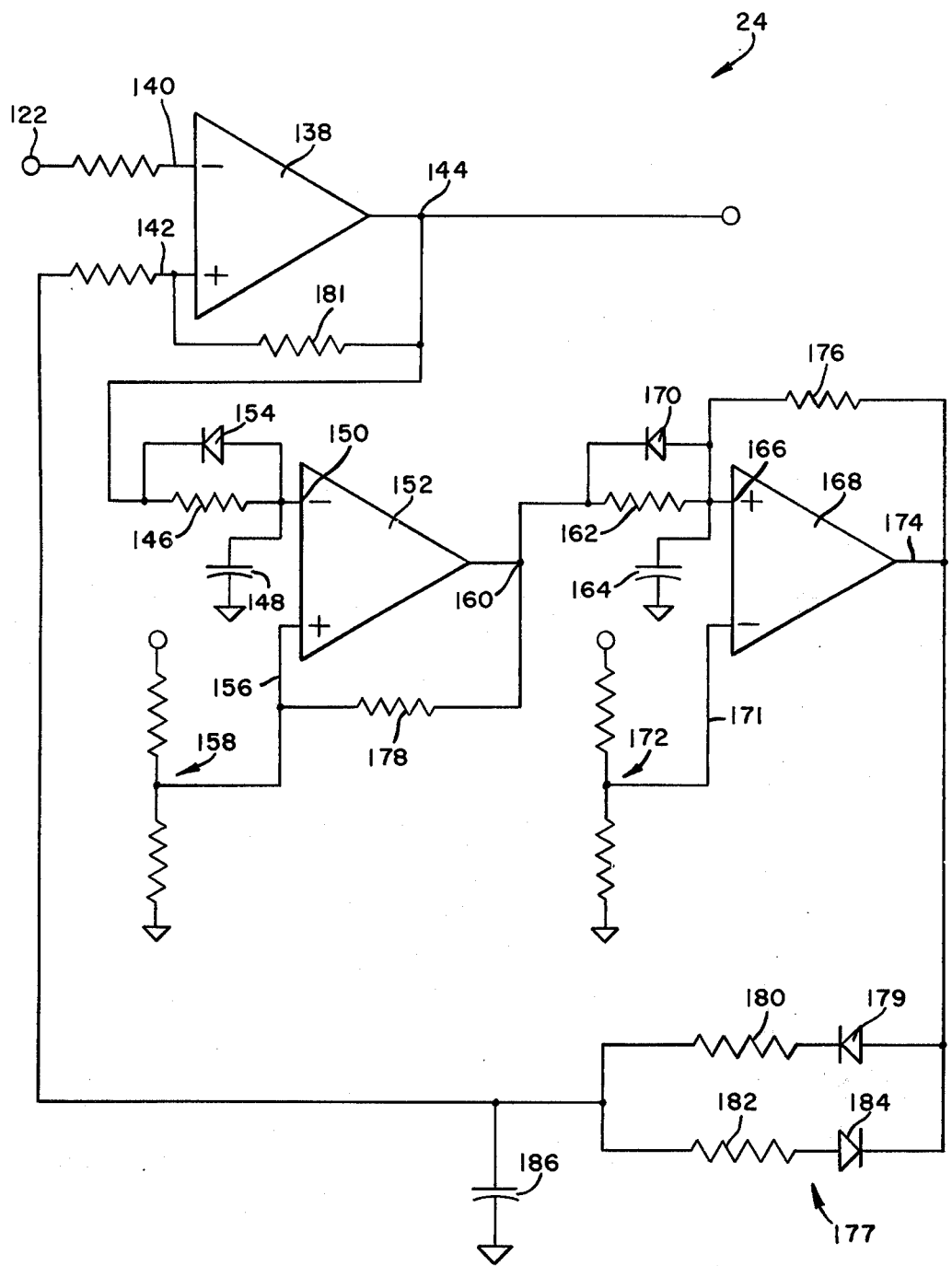
FIG. 3 is a detailed schematic illustration of the duty cycle generator used in the adaptive braking system illustrated in FIG. 1.
Figure 4:
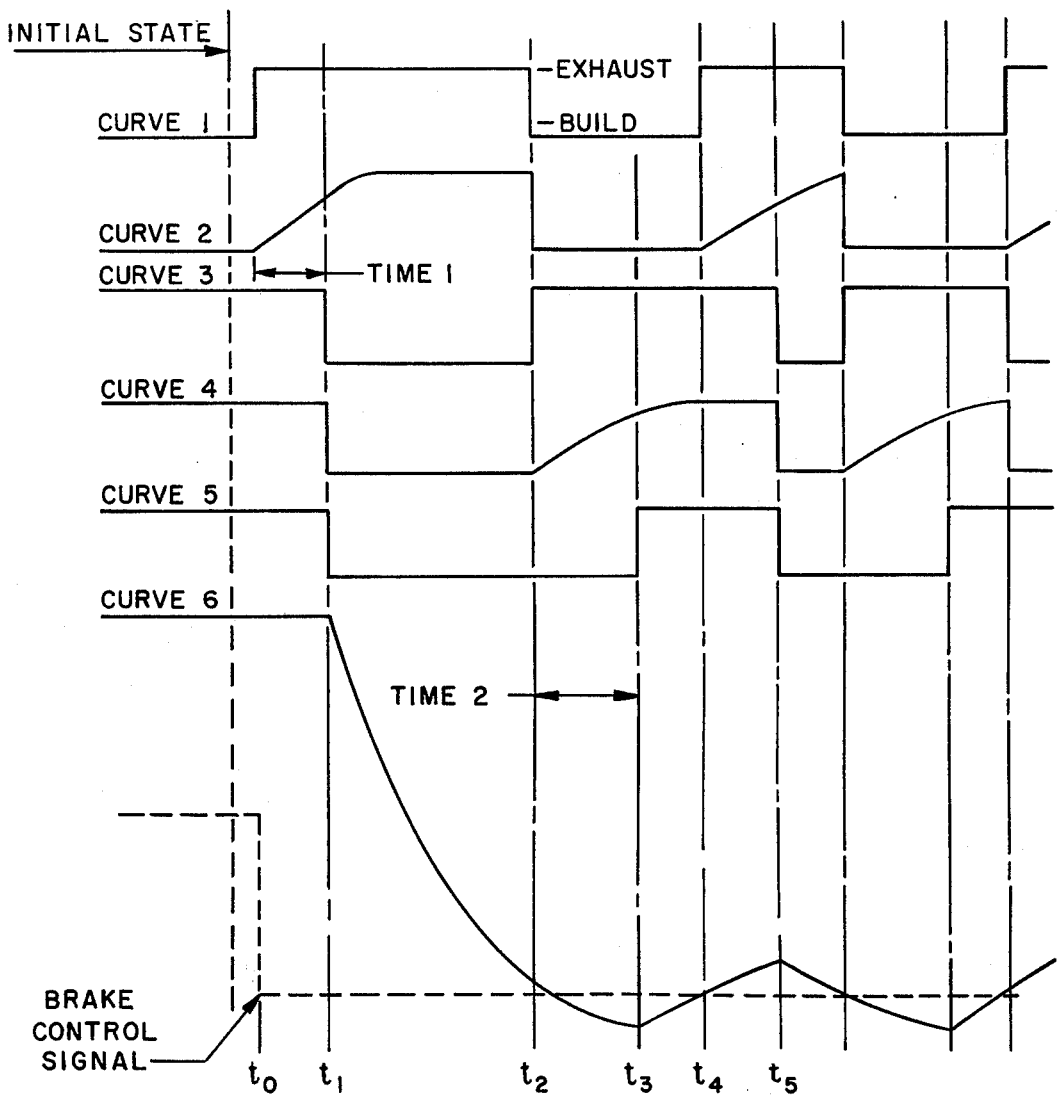
FIG. 4 is a graphical representation of the valve of the various signals generated within the duty cycle translator illustrated in FIG. 3 at various times during the operation of the adaptive braking system.

Referring now to FIGS. 3 and 4, the construction and operation of the duty cycle translator 30 will now be described in detail. Duty cycle translator 30 includes an operational amplifier 138 of a type well known to those skilled in the art which compares the signals on the positive and negative input terminals thereof and which generates a signal whenever the value of the signal on the positive terminal exceeds the value of the signal on the negative terminal. In this case, the negative terminal 140 of the amplifier 138 is connected to the output terminal 28 of the signal modifying circuit 20 and the positive terminal 142 is connected to the pseudo-pressure-feedback signal, which is generated in a manner to be described hereinafter. The signal on the output terminal 144, which is represented by the graph labeled Curve 1 in FIG. 4, is fed to the electrically actuated valve which is a part of modulator 32. When the value of the signal at the output 144 of the amplifier 138 is high, the electrically actuated valve is actuated to thereby decay braking pressure, and when the signal at terminal 144 is low, the electrically actuated valve is closed to permit braking pressure to rebuild. The signal at terminal 144 is also fed through a resistor 146 to charge a capacitor 148 which is connected to the negative terminal 150 of another operational amplifier 152 which is similar to the operational amplifier 138. A diode 154 is connected around the resistor 146, and the value of the signal at the terminal 150 of amplifier 152 is represented by the graph labeled Curve 2 in FIG. 4. The positive input terminal 156 of amplifier 152 is connected to a voltage divider network generally indicated by the numeral 158 which generates a signal transmitted to terminal 156 which represents about 66% of the maximum permissible value of the signal transmitted to terminal 150. The amplifier 152, as does the amplifier 138, compares the signals on terminals 156 and 150 and generates a signal on output terminal 60 thereof when the value of the signal on terminal 156 exceeds the value of the signal on terminal 150. The value of the signal on the output terminal 160 is illustrated graphically in FIG. 3 by the graph labeled Curve 3. The signal on output terminal 160 is fed through a resistor 162 to charge capacitor 164 which is connected to the positive terminal 66 of an operational amplifier 168 which is similar to operational amplifiers 152 and 138. A diode 170 is connected around the resistor 162. The value of the signal at terminal 166 is represented graphically by the graph labeled Curve 4 in FIG. 4. The negative input terminal 171 of the operational amplifier 168 is connected to a voltage dividing network generally indicated by the numeral 172 which is similar to the voltage dividing network 158 and which generates a signal transmitted to terminal 171 which represents about 66% of the maximum permissible value of the signal on terminal 166. Like the operational amplifiers 138 and 152, the operational amplifier 168 compares the signals on the terminals 166 and 171 and generates a signal on output 174 whenever the value of the signal on the positive input terminal exceeds the value of the signal on the negative input signal. The signal on the terminal 174 is represented graphically by the graph labeled Curve 5 in FIG. 4. Of course, necessary feedback resistors 176, 178 and 179 must be connected around the operational amplifiers 168, 152, and 138 in a manner well known to those skilled in the art.

The signal on terminal 174 is transmitted to a circuit generally indicated by the numeral 177 which consists of a diode 179 and resistor 180 connected in parallel with another resistor 182 and a diode 184, which is connected in opposite polarity of the diode 179. The output of the circuit 177 is used to control the charge on a capacitor 186 which will be charged and discharged at a rate governed by the value of the capacitor 186 and one of the resistors 180 or 182 as the case may be. The value of the charge on the capacitor 186 is represented graphically by the graph labeled Curve 6 in FIG. 4, and is the pseudo-pressure-feedback signal which approximates the brake pressure level in the actuators 34. This signal is connected to the input terminal 142 of the operational amplifier 138.

MODE OF OPERATION

Figure 2:
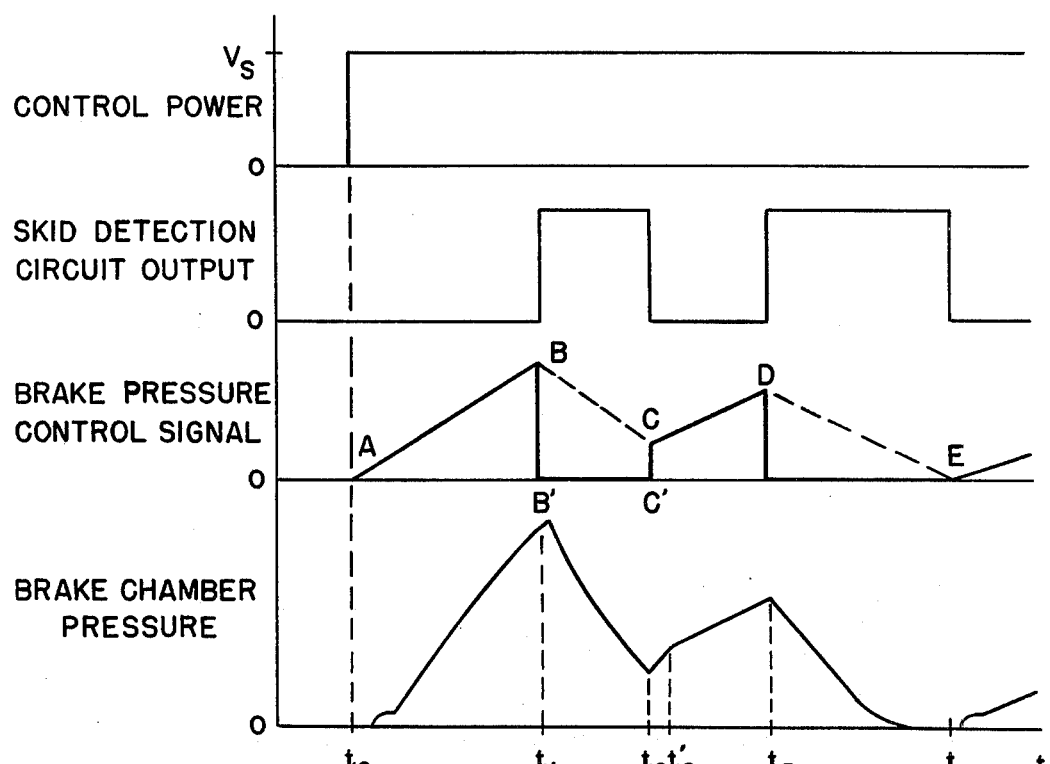
FIG. 2 illustrates graphically the signals generated by the various components of the system illustrated in FIG. 1 and also illustrates the brake pressure achieved in the brake actuators during adaptive control of the brakes of the vehicle.

Referring now to FIG. 2, the uppermost graph therein illustrates the signal at terminal 22; the second graph illustrates the signal at terminal 18; the next graph illustrates in solid lines the signal at the terminal 28 and in dashed lines the voltage across the capacitor 42 during time periods when the voltage across the capacitor 42 is different from the voltage at terminal 28; and the lowest graph on FIG. 2 plots the pressure in the brake actuators 34. All graphs are plotted as a function of the time. Assume that at time $t_0$ a brake application is effected. At this time, as indicated by the uppermost graph on FIG. 2, the voltage $V_s$ is supplied to terminal 22. Also, capacitor 42 begins charging at a substantially linear rate which is governed by the difference in the values between the current source 38 and the current sink 44. This is indicated by line A -14 B in FIG. 2. Since the flip flop 31 and AND gate 33 inhibits duty cycle translator control of the modulator 32 until after an initial incipient skidding condition is detected, unrestricted fluid communication through the modulator 32 is permitted so that the brakes are actuated in the normal manner. At time $t_1$, the skid detection circuit 16 senses an incipient skidding condition, as is illustrated in FIG. 2, and generates an incipient skidding signal on the terminal 18. This signal turns transistor 36 on, thereby shorting the terminal 28 to set flip flop 31 to initiate adaptive control and also causing the duty cycle translator 30 to actuate modulator 32. Since the output terminal 28 is grounded, and therefore the value of the control signal transmitted to the duty cycle translator 30 is at its lowest possible value as indicated by solid line B'–C' of FIG. 2, the output of the duty cycle translator 30 will cause the modulator 32 to exhaust brake pressure at the maximum permissible rate. As was pointed out hereinabove, the duty cycle translator 30 responds to the value of the control signal on the output terminal 28 to actuate the modulator in response to the value of the control signal. When a very low value of the control signal is generated, such as the case when the terminal 28 is grounded as represented by solid line B'–C' in FIG. 2, the modulator is in its full exhaust condition, and consequently, the brake pressure exhaust rate is maximized. As will be pointed out hereinafter, the maximum possible value of a control signal of output terminal 28 is equal to the value $V_s$ voltage source 26; consequently, an uninhibited rate of brake pressure increase would then be permitted by the modulator.

As brake pressure is decayed while the terminal 28 is shorted to ground, the capacitor 42 must discharge through the constant current sink 44, since diode 48 prevents discharge of the capacitor in any other manner. Since capacitor 42 is discharging through constant current sink 44, the capacitor 42 discharges at a linear rate, as indicated by dotted line B–C in FIG. 2. As is illustrated in the lowermost graph of FIG. 2, brake pressure builds at a substantially uninhibited rate during time intervals $t_o - t_1$, and decays at a substantially uninhibited rate in the time interval $t_1 - t_2$. At time $t_2$, the incipient skidding signal on terminal 18 is extinguished, thereby turning transistor 36 off. At this time, the value of the control signal on terminal 28 is equal to the voltage across th capacitor 42. Consequently, as is illustrated in FIG. 2, the value of the control signal on terminal 28 is stepped upwardly an amount corresponding to the value of the charge on capacitor 42. Consequently, the duty cycle translator 30 will call for a step increase in the braking pressure by modulator 32. However, because of the inherent time delays in the system, the brake actuator cannot respond to the step increase immediately, but does build braking pressure at a very rapid rate for a brief time interval, indicated by the interval $t_2 - t_2'$ in FIG. 2, until the pressure specified by the value of the control signal is attained. After the incipient skidding condition terminates at time $t_2$, the charge on the capacitor 42 again begins to build at the linear rate governed by the difference in the value of the constant current source 38 and sink 44. This is illustrated graphically by line segment C–D in FIG. 2. Since the duty cycle translator 30 builds braking pressure at a rate proportional to the rate of increase of the value of the signal on terminal 28, braking pressure builds proportionally in the interval $t_2' - t_3$, as illustrated in the lowermost graph of FIG. 2. At time $t_3$, the skid detecting circuit 16 again senses an incipient skidding condition, and generates a signal on terminal 13 which turns transistor 36 on to again ground the terminal 28. Consequently, as described hereinabove, the duty cycle translator calls for modulator 32 to exhaust at its maximum permissible rate in the time interval $t_3 - t_4$. At time $t_4$, the skid detecting circuit 16 senses that an incipient skidding condition no longer exists and consequently terminates the incipient skidding condition signal on terminal 18. As illustrated in the lowermost graph of FIG. 2, the pressure in the brake actuators 34 decreases at the maximum possible rate during the time interval $t_3 - t_4$. Of course, during this brake pressure decay cycle, the charge on the capacitor has been decayed linearly as described hereinabove, which is represented graphically in FIG. 2 by dashed line segment D–E. However, the time interval $t_3 - t_4$ that the skid detecting circuit 16 senses an incipient condition is much longer than the time interval $t_1 - t_2$, and therefore the value of the charge on the capacitor 42 is decreased until substantially a zero charge remains. If the fluid pressure decay cycle lasts longer than the time interval $t_3 - t_4$ illustrated in FIG. 2, the charge on capacitor 42 would, of course, remain at zero charge. Consequently, when the incipient skidding condition terminates at time $t_4$, there will be no step increase in the value of the control signal 28 as was the case at time $t_2$ when the other brake pressure decay cycle terminated. Accordingly, the value of the control signal will increase at a substantially linear rate as governed by the size of current source 38 and current sink 44 as discussed hereinabove. Operation of the system continues in this manner until the vehicle is brought to a stop or until the brakes of the vehicle are released. A–

Operation of the duty cycle generator 30 will now be described. Assume that in the initial condition of the duty cycle generator 30, before initiation of adaptive control of the vehicle's brakes, that the relative values of the signals on terminals 140 and 142 of the comparator 38 are such that the value of signal on 144 is low, thereby causing the modulating relay valve 134 to permit uninhibited fluid communication to the brake actuators 34. It is further assumed that the system has remained in this condition prior to the initiation of adaptive braking control of the vehicle's brakes for a time period longer than the time constants of the various components on the circuitry of the duty cycle translator 30. In this condition, capacitor 148 is discharged through the diode 154 so that the signal on input terminal 150 of comparator 152 is relatively low. Consequently, the signal on terminal 160 will be high, as illustrated in Curve 3 in FIG. 4. The high value of the signal on the terminal 160 maintains the capacitor 164 charged, and consequently, the signal on terminal 166 of comparator 168 is greater than the value of the signal on terminal 171 of comparator 168. Therefore, the signal on output terminal 174, which is illustrated as Curve 5 of FIG. 3, will also be at a relatively high value. Consequently, the diode 179 will be forward biased, so that the capacitor 186 will be fully charged. Consequently, at the initiation of adaptive control of the vehicle brakes at time $t_0$ illustrated in FIG. 3, the value of the signal on terminal 142 will be at its maximum permissible value.

Assume that at time $t_0$ in FIG. 4 that the skid detecting circuit 16 senses an incipient skidding condition of the vehicle wheel 14 and thereby causes the brake control signal at the output terminal 28 of signal modifying circuit 20 to drop to its lowest possible value. When this occurs at time $t_0$, comparator 138 switches, thereby causing the value of the signal on terminal 144 to switch to the high state. This signal actuates the modulator 32 to initiate a brake pressure reduction in the brake actuators 34. The high value of the signal on terminal 144 charges capacitor 148 with a time constant which depends upon relative values of the resistor 146 and the capacitor 148. When the value of the signal across the capacitor 148 represented on terminal 150 of amplifier 152 exceeds the value of the signal transmitted to the terminal 156 of this amplifier, which represents, as pointed out hereinabove, about 66% of the maximum value of the signal on terminal 150, the amplifier 152 switches, causing the signal on output terminal 160 thereof, which is represented by Curve 3 in FIG. 4 to switch from the high to the low state. The time at which the capacitor 148 achieves approximately 66% of its maximum value is represented by time $t_1$ in FIG. 4. As pointed out hereinabove, at time $t_1$ the value of the signal on terminal 160 switches from the high to the low state, which causes the charge on the capacitor 164 to decay rapidly through diode 170, thereby almost immediately reducing the value of the signal on terminal 166 of operational amplifier 168 to a value less than the signal on the terminal 171. When this occurs, the value of the signal in the output terminal 174 of operational amplifier 168 switches from the high state to the low state, as illustrated by Curve 5 in FIG. 4. The low value of the signal on terminal 174 back biases the diode 179 and forward biases diode 184, so that capacitor 186 discharges through resistor 182 and diode 184 with a time constant dependent upon the relative values of the resistor 182 and the capacitor 186. The value of the charge across the capacitor 186, which is the pseudo-pressure-feedback signal connected to the terminal 142 of operational amplifier 138, decays in an exponential manner in the time period $t_1 - t_3$, as illustrated by Curve 6 in FIG. 4. It will be noted that, although the exhaust cycle was initiated at time $t_0$, the value of the feedback signal does not recognize any decrease in braking pressure until time $t_1$. Consequently, the time interval $t_0 - t_1$ represents the time delay required to actuate the electrically operated valve which controls the modulator 32. Similarly, it will be noticed that Curve 6 in FIG. 4 continues to decrease even when the value of this signal drops below the value of the brake control signal at time $t_2$ in FIG. 4, and continues to decrease until time $t_3$. Consequently, the time interval $t_2 - t_3$ represents the time delay required to turn off the aforementioned solenoid in the modulator 32. However, when the value of the pseudo-pressure-feedback signal drops below the command value of the brake control signal at time $t_2$ in FIG. 4, the operational amplifier 138 again switches states, so that the value of the signal on the terminal 144 again goes low to turn off the electrically actuated valve to initiate a brake pressure increase in the brake actuators 34. When this occurs, the charge on capacitor 148 bleeds off rapidly through the diode 154, thereby causing operational amplifier 152 to immediately switch states to again bring the value of the signal on terminal 160, as represented by Curve 3 in FIG. 4, to the high state. When this occurs, capacitor 164 will be charged with a time constant dependent upon the relative values of the capacitor 164 and the resistor 162. When the charge on the capacitor 164, which is transmitted to input terminal 166 of operational amplifier 168, exceeds 66% of its maximum permissible charge, the signal on terminal 174, which is represented by Curve 5 in FIG. 4, switches to the high state. This occurs at time $t_3$ in FIG. 4. When the diode of the signal on terminal 174 goes high, diode 179 will be forward biased and diode 184 will be back biased, so that the capacitor 186 will be charged with a time constant dependent upon the relative values of the resistor 180 and the capacitor 186. Since the charge on the capacitor 186, which is the pseudo-pressure-feedback signal is now increasing, the charge decrease across capacitor 186 terminates at time $t_3$ and increases at an exponential rate dependent upon the relative values of resistor 180 and capacitor 186 in the time interval $t_3 - t_5$. It will, of course, be noted that the charge increase across the capacitor 186 continues even though the value of the charge on the capacitor 186, and therefore the value of the pseudo-pressure-feedback signal, increases above the value of the brake control signal on terminal 140 at time $t_4$. The time $t_4 - t_5$ represents the solenoid turn-on time for another brake pressure decay cycle. As illustrated in Curve 1 of FIG. 4, at time $t_4$ the operational amplifier 138 again switches states to initiate another brake pressure decay cycle, in precisely the same manner as discussed hereinabove when the duty cycle translator is initially actuated at time $t_0$. The duty cycle translator 30 continues to operate in this manner, oscillating about the brake control signal, for an indefinite time period.

At some subsequent time, the skid detecting circuit 16 will sense that an incipient skidding condition of the wheel 14 no longer exists. Therefore, the value of the brake control signal transmitted to terminal 140 of operational amplifier 138 will increase. If a step increase is specified, a step increase in the value of the brake control signal transmitted to terminal 140 of the duty cycle translator 30 will occur. In this case, the duty cycle translator 124 will continue to operate precisely as described above to increase pressure by deactuating the electrically actuated valve to permit an exponential increase in braking pressure, similar to the exponential decrease in the time interval $t_1 - t_2$ illustrated by Curve 6 in FIG. 4. Also, the duty cycle translator 30 will respond to changes in the brake control signal transmitted to terminal 140 which are other than step increases or decreases by adjusting the relative times that the values of the signal on terminal 144 are high or low. In conclusion, it will be noticed by those skilled in the art that the duty cycle translator 30 responds to a step decrease in the brake control signal transmitted to terminal 140 by causing the modulator 32 to exhaust pressure until the desired pressure level is approximately attained and then by causing the value of the signal on terminal 144 to oscillate on and off to maintain the desired pressure level. Similarly, the duty cycle translator responds to a step increase in the brake control signal transmitted to terminal 40 by turning off the electrically actuated valve within the modulator 32 until the desired pressure level is substantially attained, and then by oscillating the value of the signal on terminal 144 to maintain this pressure level. Similarly, the translator 30 will respond to a ramp increase or decrease in the value of the brake control signal by remaining off in the case of a pressure increase for a proportionally longer time during each cycle than it remains on so that the average fluid pressure level increases in a ramp-like manner. The device, of course, operates in the reverse manner for a ramp decrease in the value of the signal transmitted to the terminal 140. The duty cycle translator 30 will inherently respond in a similar manner for any other changes in the value of the signal transmitted to the terminal 140.

What is claimed is:

1. In a vehicle having a wheel, a brake controlling said wheel, and fluid pressure responsive means for actuating said brake, an adaptive braking system controlling communication to said fluid pressure responsive means comprising:

speed sensing means for generating a speed signal proportional to the rotational velocity of said vehicle wheel;

skid detecting means responsive to said speed signal for generating a skid detecting signal when an incipient skidding condition of said wheel is detected and terminating said skid detecting signal when the incipient skidding condition terminates;

signal modifying means responsive to the output of said skid detecting means for generating a brake pressure control signal; and modulator means responsive to said brake pressure control signal for communicating fluid pressure levels to said fluid pressure responsive means in accordance to the value of said brake pressure control signal;

said signal modifying means including first means responsive to generation of said skid detecting signal for generating a value of said brake pressure control signal causing said modulator means to decay the braking pressure communicated to said fluid pressure responsive means, said first means further including second means responsive to termination of said skid detecting signal for generating a value of said brake pressure control signal initiating a brake pressure build cycle causing said modulator means to increase braking pressure at a predetermined rate less than the maximum rate of increase permitted by the modulator during at least a portion of said build cycle;

said second means being responsive to actuation of the brakes of the vehicle to generate an intermediate signal which increases in a predetermined manner during increase of braking pressure and which decreases in predetermined manner when said modulator means decays the braking pressure communicated to said actuators, said first means inhibiting said intermediate signal until said build cycle is initiated whereupon said first means equates the value of said control signal with the value of said intermediate signal.

2. The invention of claim 1:

wherein said first means generates a step increase in the value of said control signal upon initiation of the build cycle to equate the value of the control signal with the value of the intermediate signal, if the value of the intermediate signal is greater than the value of said control signal at the initiation of said build cycle.

3. In a vehicle having a wheel, a brake controlling said wheel, and fluid pressure responsive means for actuating said brake, an adaptive braking system controlling communication to said fluid pressure responsive means comprising:

speed sensing means for generating a speed signal proportional to the rotational velocity of said vehicle wheel;

skid detecting means responsive to said speed signal for generating a skid detecting signal when an incipient skidding condition of said wheel is detected and terminating said skid detecting signal when the incipient skidding condition terminates;

signal mofifying means responsive to the output of said skid detecting means for generating a brake pressure control signal; and modulator means responsive to said brake pressure control signal for communicating fluid pressure levels to said fluid pressure responsive means in accordance to the value of said brake pressure control signal;

said signal modifying means including first means responsive to generation of said skid detecting signal for generating a value of said brake pressure control signal causing said modulator means to decay the braking pressure communicated to said fluid pressure responsive means, said first means further including second means responsive to termination of said skid detecting signal for generating a value of said brake pressure control signal initiating a brake pressure build cycle causing said modulator means to increase braking pressure at a predetermined rate less than the maximum rate of increase permitted by the modulator during at least a portion of said build cycle;

said control signal varying between maximum and minimum values, the maximum value of said control causing said modulator means to build braking pressure at the maximum rate permitted by the modulator means, the minimum value of said control signal causing said modulator means to decay braking pressure at the maximum rate permitted by the modulator means.

4. The invention of claim 3:

wherein said second means generates an intermediate signal increasing in a predetermined manner during increase of braking pressure during said build cycle and which decreases in a predetermined manner when said modulator means decays the braking pressure communicated to said actuator, said first means inhibiting said intermediate signal until said build cycle is initiated whereupon said first means equates the value of said control signal with the value of said intermediate signal.

5. The invention of claim 4:

wherein said signal modifying means includes an input connected to said skid detecting means, and an output connected to said modulating means;

said first means includes switching means connected between said output of the signal modifying means and ground and responsive to the signal at said input to short said output to ground when said skid detecting signal is generated to thereby establish the value of said control signal at said minimum value, said switching means terminating said shorting of the output of the signal modifying means when said skid detecting signal terminates.

6. The invention of claim 5:

wherein said second means includes value storage means connected to said output of the signal modifying means and means increasing the value stored in said value storage means at a predetermined rate until said predetermined maximum value of said control signal is attained upon termination of said skid detecting signal, said intermediate signal being proportional to the value on said value storage means.

7. The invention of claim 6:

wherein said second means includes means decreasing the value stored in said value storage means at a predetermined rate upon termination of said skid detecting signal until said minimum value of said control signal is attained.

8. The invention of claim 6:

wherein said signal modifying means includes a second input, a source having a predetermined value, switch means connecting said source to said second input when a brake application is effected, said source establishing the maximum value to be stored on said value storage means.

9. The invention of claim 5:

wherein said second means includes value storage means connected to said output of the signal modifying means and means decreasing the value stored on said value storage means at a predetermined rate until said predetermined minimum value of said control signal is attained upon generation of said skid detecting signal, said intermediate signal being proportional to the value on said value storage means.

* * * * *